July 30, 1957 S. LUBKIN 2,801,407

TIMING CHANNEL RECORDING

Filed March 30, 1955 2 Sheets-Sheet 1

INVENTOR.
SAMUEL LUBKIN
BY S.C. Yuter
ATTORNEY

July 30, 1957 S. LUBKIN 2,801,407

TIMING CHANNEL RECORDING

Filed March 30, 1955 2 Sheets-Sheet 2

INVENTOR.
SAMUEL LUBKIN

BY S.C. Yuter

ATTORNEY.

United States Patent Office 2,801,407

Patented July 30, 1957

2,801,407

TIMING CHANNEL RECORDING

Samuel Lubkin, Bayside, N. Y., assignor to Underwood Corporation, New York, N. Y., a corporation of Delaware Application March 30, 1955, Serial No. 497,891

6 Claims. (Cl. 340—174)

This invention relates to timing channels on rotatable magnetic drums for controlling the timing systems of high-speed electronic digital computers and more particularly to a method of and apparatus for recording timing channels.

Computing consists of performing arithmetic and logical operations on numbers. A digital computer performs such operations with numbers or alphabetic data expressed in the form of digits. The binary system of computation, using the binary digits "1" and "0," is well suited to computers since a complete binary order of a binary number may be expressed by the presence or absence of a particular condition; for example, the presence or absence of a given magnetic state on a unit area or cell of a magnetic medium, or the presence or absence of a pulse at a specified position in a train of pulses.

In computers of the data processing type combinations of binary digits may represent alphabetic information in addition to numbers. The processing of this information may consist of sorting, collating and extraction of specified items from a group in accordance with predetermined criteria. Data processing may also include arithmetic operations.

Any connected series of arithmetic or data processing operations requires the storage of the information for later reference. In one type of storage system information coded in terms of binary digits is magnetically recorded in cells on the surface of a rotating drum. If the cell is magnetized in one direction, the digit it represents is "1." If the cell is magnetized in the other direction, the digit is "0." The magnetized cells corresponding to individual digits may be arranged in a peripheral track on the cylindrical surface of the drum. A stationary magnetic head is associated with the track and performs the operations of writing (recording) and reading information in that track.

A connected series of arithmetic or data processing operations implies the necessity for transferring information from a predetermined cell at a particular time to the computer. Therefore, some method of synchronizing the operation of the computer with the rotating drum is required to select the location of the cell carrying the recorded information. This requires that the exact position of the drum must be communicated to the computer, where a comparison of the drum position with the location of the information required by the computer is made.

In addition, it is necessary to time or coordinate the pulse trains which represent the information employed to solve a particular problem so that the computer will operate properly.

One known way of coordinating the pulse trains which represent information and synchronizing the computer with the drum is to record a timing track in the form of a continuous sine wave or a series of pulses along the periphery of the cylindrical surface of the drum parallel to the information tracks. The recorded timing track is employed directly to generate the timing pulses and therefore the pulse repetition rate used in the computer. However, due to the difficulty of accurately closing the sine wave or pulse train on the magnetic drum, a closure error may result so that the generated pulse repetition rate may vary during each drum cycle.

The significance of the closure error is that the time interval between corresponding points on two successive pulses from the timing track will not remain constant. The variation may be cumulative over a portion of a drum revolution and in an extreme case, for example, thirty pulses from one segment of the timing track may occupy the same time interval as thirty-one pulses from a different but equal segment. Thus, even a minor imperfection in the timing track recording will affect the proper operation of the computer circuitry since it is necessary that the pulse repetition rate be constant.

Therefore, it is of great importance to have a timing channel recorded without closure error on the magnetic storage drum.

One method of achieving a highly precise recording so that closure error is avoided is to employ a mechanical dividing head to slowly rotate the drum, and to produce electrical signals in response to a mechanically activated switch attached to the dividing head. The electrical signals are recorded on the drum as the drum is rotated. This method requires a precision dividing head which is very expensive. Further, it is a long and time consuming process which is subject to many pitfalls.

Therefore, an object of the invention is to provide an improved method of recording a precise timing channel on a rotating magnetic drum.

Another object of the invention is to provide a method of and apparatus for quickly and accurately recording a timing channel on a rotating magnetic drum.

A further object of the invention is to provide a method of recording a timing channel which has negligible closure error on a rotating magnetic drum.

Still another object of the invention is to provide a method of and apparatus for automatically recording a timing signal on a rotating magnetic drum.

In accordance with one application of the method of the invention, a sequence of signals is generated together with marker signals which correspond to selected signals in the sequence of signals. A signal is also recorded on the drum. Then, with the aid of an oscilloscope or similar instrument, the timing relationship between the recorded signal and the marker signals is varied. When a predetermined timing relationship is noted, a switch is actuated to connect the source of the sequential signals to suitable recording apparatus and the timing channel is recorded on the drum.

The connection is made only momentarily since a complete revolution occurs in a very short time. It should be noted that although the recording may be made during an interval of time which is greater than the time of a number of revolutions, the timing relationship does not change enough to produce a closure error.

In a refinement of this application of the method, with the rotating drum slowing down, the observance of a predetermined timing relationship between the recorded signal and the marker signals is employed to initiate a recording for a given number of revolutions so that an averaging effect is achieved.

In accordance with another application of the method of the invention, a timing track consisting of a predetermined number of sequential signals is recorded on a rotating magnetic drum in the following manner: the predetermined number of sequential signals is generated periodically and a plurality of marker signals is also generated, each marker signal corresponding to a selected signal in the predetermined number of sequential signals. A marker signal is recorded on the rotating magnetic drum and periodically sensed while the time relationship between the sensed signal and the marker signals is varying. When a given timing relationship occurs (indicating the drum velocity which will allow the predetermined number of signals to be recorded exactly around the complete periphery of the drum), the predetermined number of signals is recorded in a channel on the rotating drum.

In accordance with a refinement of this application of the method, the even occurring marker signals are recorded in one channel on the rotating magnetic drum and the odd occurring marker signals are recorded in a second channel. Each marker pulse recording erases the previous marker signals in the associated channel. The channels are read alternately so that a recorded marker pulse is sensed once every drum revolution.

The basic principle of each application of the method is to use a signal generated by the moving drum to indicate when the drum velocity corresponds to a speed which will allow the exact number of timing signals to be recorded completely around the periphery of the drum.

The time relationship may be varied by changing the speed of the rotating drum, the frequency of the generated signals, or both.

Other objects, features and advantages will appear in the following detailed description of the invention which is accompanied by drawings wherein:

Fig. 1 schematically shows apparatus employed for manually determining when to record a timing channel on a rotating magnetic drum in accordance with the preferred application of the method of the invention.

It should be noted that the problem of improper closure of a timing channel may be avoided by using a computer pulse generating system of the type disclosed and claimed in the co-pending application of Eugene Leonard, Serial No. 316,860, filed October 25, 1952, and assigned to the same assignee, which employs a separate pulse generator to generate the pulse signals used in the computer, a continued deviation in synchronism between the frequency of a control signal produced by a control channel on the rotating drum and the pulse repetition rate being utilized to change the pulse repetition rate to restore synchronism. The recorded control signal does not have to be very precise since closure error may be disregarded because only the average frequency is utilized. However, in some applications, particularly small computers, it is preferable that the timing pulses be generated directly from a highly precise recorded timing track on the drum in order to minimize the overall cost.

Figure 1:
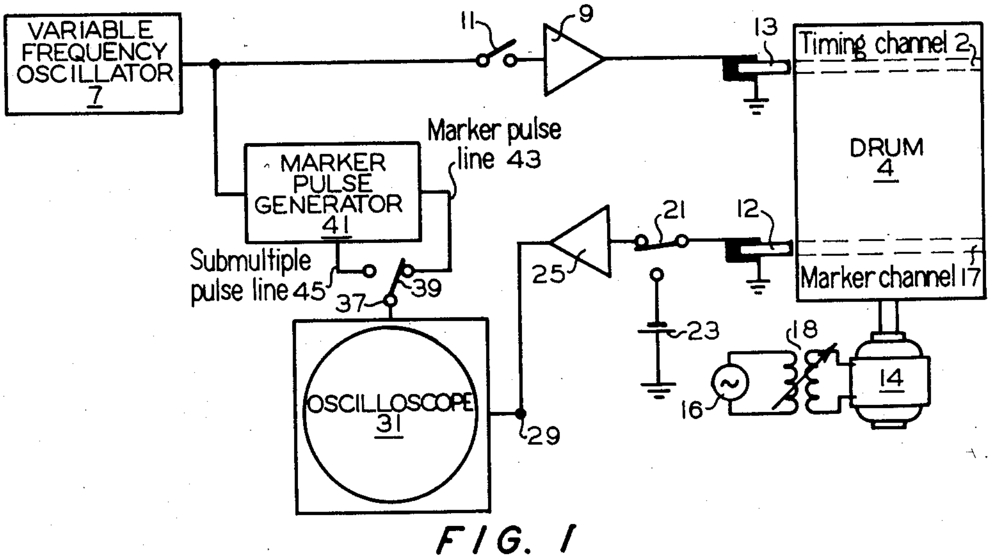

The apparatus for performing the manual application of the invention is illustrated in Fig. 1. Operation of this apparatus will be described in connection with recording a timing channel 2 on the drum 4 comprising eighteen hundred pulses which are recorded completely around the periphery of the drum. The drum 4 comprises a cylindrical body made of aluminum and coated with a magnetic material such as ferrous or ferric oxide. The drum 4 is rotated by the motor 14 which is coupled to the power source 16 by the variable transformer 18.

Timing pulses are generated by the variable frequency oscillator 7 which is connected to the write amplifier 9 by the record switch 11. The output of the write amplifier 9 is coupled to the magnetic head 13 which is mounted adjacent to the drum 4 and scans the timing channel 2.

A magnetic head 12 is mounted adjacent the drum 4 to sweep a marker channel 17. The magnetic head 12 is switchably connected via switch 21 to either the battery 23 which is grounded or the input of the read amplifier 25.

The output of the read amplifier 25 is connected to the input terminal 29 of the oscilloscope 31. The trigger terminal 37 of the oscilloscope 31 is switchably connected via the switch 39 to either of two output terminals of the marker pulse generator 41. The input of the marker pulse generator 41 is connected to the variable frequency oscillator 7 and functions to generate marker pulses on the marker pulse line 43 connected to one terminal switch 29 and submultiple marker pulses on the submultiple pulse line 45 connected to the other terminal of switch 39.

In the following illustrated example of one application of the method of the invention, the marker pulse generator 41 produces a pulse on the marker pulse line 43 for every eighteen hundred pulses received, and a pulse on the submultiple pulse line 45 for every thirty-six pulses received.

Initially it will be assumed that the motor 14 when connected to the power source 16 operates at the speed of about 3587 revolutions per minute so that, as will be hereinafter indicated, the variable frequency oscillator has to be set to a frequency of 107.6 kilocycles per second in order to generate eighteen hundred pulses which will completely fill the timing channel 2 without closure error.

A signal is recorded in the marker channel by momentarily switching switch 21 to the battery 23 when the drum 4 is not rotating. With the switch 21 again connected to the read amplifier 25 and the drum 4 turning at the normal operating speed, the recorded signal is detected by the magnetic head 12, amplified by the read amplifier 25 and fed to the input terminal 29 of the oscilloscope 31. As will hereinafter be explained, the frequency of the variable frequency oscillator 7 is adjusted to obtain the proper timing relationship with the frequency of the recorded pulse signal.

It should be noted that the speed of the rotating drum could also be varied by adjusting the variable transformer 18 to produce the proper time relationship.

With switch 39 connecting the trigger terminal 37 to the marker pulse line 43 and with switch 11 open, the time relationship between the recorded signal and the signal produced by the variable frequency oscillator is varied. When the proper time relationship occurs, the switch 82 is momentarily closed to record a plurality of timing signals around the drum 4 in the timing channel 2.

More particularly, the sweep time of the oscilloscope 31 is set to about seventeen milliseconds and the frequency of the variable frequency oscillator 7, which is initially set to about 107.6 kilocycles per second, is slowly varied until the recorded pulse remains steady in one position on the screen of the oscilloscope 31 indicating that the recorded signal generated by the rotating drum 4 is in synchronism with the signal generated by the variable frequency oscillator 7. (It should be noted that a similar indication will result if an integral multiple or submultiple relationship exists between the two signals. However, due to the relative accuracy of the variable frequency oscillator 7 and the relative constant velocity of the drum 4, the possibility of the occurrence of synchronism at other than exactly equal frequencies may be disregarded.)

When the frequency of the recorded signal and the signal from the variable frequency oscillator 7 are exactly the same the pulse on the oscilloscope will remain steady in one position. If the signals are exactly in phase, the phase will appear at the left edge of the screen. In the usual case the pulse will appear away from the left edge of the screen to indicate a phase difference. However, since only the frequencies of the two signals are required to be the same to indicate that the drum 4 is turning at the proper velocity in order to accurately record a timing channel, the existence of phase difference between the two signals is of no concern.

Since the linear width of the pulse on the screen of the oscilloscope 31 is very small, the trigger input terminal 37 may be connected to the submultiple pulse line 45 which in the illustrated example will provide a pulse corresponding to every thirty-sixth input pulse. This permits the sweep time to be reduced to about three hundred microseconds in order to produce a much broader pulse on the screen of the oscilloscope 31. The purpose of this procedure is to be able to amplify the displayed pulse to discern whether the observed pulse is moving or not. Further adjustment of the variable frequency oscillator 7 may be necessary to more accurately stabilize the position of the displayed pulse.

When the apparatus is finally adjusted so that the displayed pulse is clearly fixed in position switch 11 is momentarily closed and a sequence of pulses from the variable frequency oscillator 7 is recorded in the timing channel 2 as explained above. It should be noted that the one revolution of the drum 4 will occur in about seventeen milliseconds so that several times eighteen hundred pulses are recorded. However, since the drum 4 does not perceptively change speed during the time that the switch 11 is closed and since it can be assumed that the variable frequency oscillator 7 remains stable for the same period of time, the only result of recording for several revolutions is to superimpose the recorded pulses exactly in phase so that no closure error results.

The above application of the method of the invention may be modified to allow the drum 4 to slowly decrease in speed by reducing the voltage at the motor 14 with the variable transformer 18. Under these conditions, with the frequency of the variable frequency oscillator 7 constant, switch 11 is closed when the displayed pulse is approaching stabilization so that the superimposition of several revolutions of recording will produce an average recording with no closure error.

Figure 2:
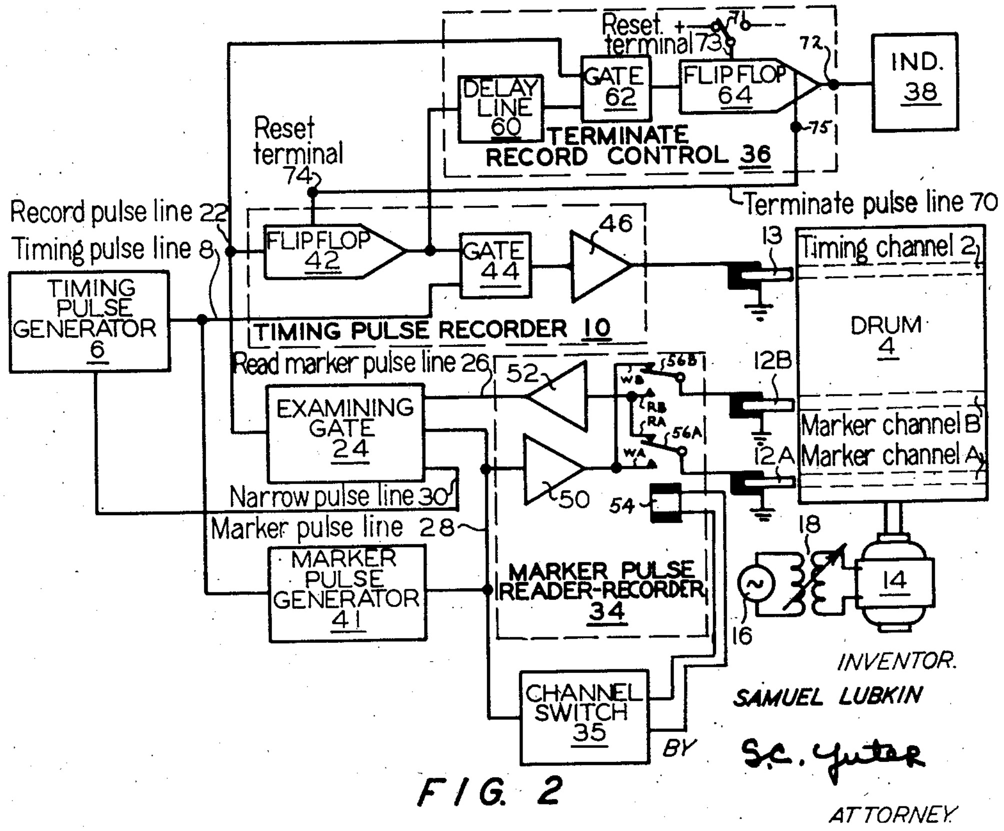
Fig. 2 is a schematic block diagram of apparatus which is employed to record automatically a timing channel on a rotating magnetic drum in accordance with another application of the method of the invention.

Referring to the automatic timing channel recording apparatus shown in Fig. 2, this application of the method of the invention will also be described in connection with recording a timing channel 2 on the drum 4.

The automatic timing channel recording apparatus comprises the timing pulse generator 6, the timing pulse recorder 10, the examining gate 24, the marker pulse generator 41, the marker pulse reader-recorder 34, the channel switch 35, the terminate record control 36 and the indicator 38.

The timing signals, which are recorded at the proper time in timing channel 2, are generated by the timing pulse generator 6 which is connected by the timing pulse line 8 to the timing pulse recorder 10. The output of the timing pulse recorder 10 is coupled to the magnetic head 13 which is positioned adjacent to the timing channel 2 of the drum 4.

The drum 4 is rotated by the motor 14 which is connected to the power source 16 via the variable transformer 18. Thus, the timing channel 2 is scanned by the magnetic head 13 as the drum 4 is rotated and any signals fed from the timing pulse recorder 10 are recorded in the timing channel 2.

It will be assumed that eighteen hundred timing pulses are to be recorded in the timing channel 2 and that the pulse repetition rate of the timing pulse generator 6 is one hundred kilocycles per second. Thus, if the drum 4 is rotating at a speed of one revolution in exactly eighteen milliseconds when the timing pulses are recorded, the eighteen hundred pulses will completely occupy the timing channel 2 and there will be no closure error since the pulse period of each timing pulse is ten microseconds.

The timing pulse recorder 10 is activated by a record pulse appearing on the record pulse line 22 which connects the examining gate 24 to the timing pulse recorder 10. The appearance of a record pulse on the record pulse line 22 indicates that the drum 4 is rotating at the proper speed in order to record the eighteen hundred pulses completely around the periphery of the drum 4.

The record pulse is generated at the output of the examining gate 24 when pulses are simultaneously present on the read marker pulse line 26, the marker pulse line 28 and the narrow pulse line 30. The read marker pulses are sensed from a marker channel on the rotating drum 4 as will be hereinafter indicated.

The marker pulses are generated by the marker pulse generator 41 which is connected to the timing pulse generator 6 via the timing pulse line 8 and to the examining gate 24 via the marker pulse line 28.

The marker pulse generator 41 functions (in the illustrated example) to generate one pulse for every eighteen hundred timing pulses received from the timing pulse generator 6. Each marker pulse performs three functions:

1. It is recorded in one of the marker channels A and B by the marker pulse reader-recorder 34;
2. It activates the channel switch 35 which functions to switch the marker pulse reader-recorder 34 between the marker channels A and B; and
3. It is coupled to the examining gate 24 to be compared with a read marker pulse from the rotating drum which is amplified by the marker pulse reader-recorder 34.

The marker pulses are recorded in the marker channels A and B alternately. The recorded marker pulses are read by the magnetic heads 12A and 12B from the marker channels A and B alternately, one recorder marker pulse being sensed each revolution. The switching between the marker channels A and B is controlled by the channel switch 35.

Briefly, a timing signal is accurately recorded in the timing channel 2 of the drum 4 by causing the drum 4 to slow down while comparing the recorded marker pulses with subsequently generated marker pulses until coincidence occurs indicating that the drum 4 is rotating at the proper recording speed. When coincidence occurs the examining gate 24 passes a record pulse to the timing pulse recorder 10 which is activated and records eighteen hundred pulses in the timing channel 2. At the eighteen hundredth pulse the next marker pulse generated appears at the examining gate 24 simultaneously with the next recorder marker pulse which is read to produce a second record pulse which activates the terminate record control 36 which terminates the recording and actuates an indicator 38 to signal that the operation is completed. The terminate record control 36 could also be activated by a signal on the read marker pulse line 26 or the marker pulse line 28.

The timing pulse recorder 10 includes the flip flop 42, the gate 44 and the amplifier 46 in series. The record pulse line 22 is connected to the input of the flip flop 42. The output terminal of the flip flop 42 is coupled to the gate 44. The gate 44 functions to pass a pulse when positive signals are simultaneously present at its input terminals. When flip flop 42 is in reset condition the potential at the output terminal of the flip flop 42 is negative blocking the gate 44. When the flip flop 42 is set by a record pulse a positive potential appears at its output terminal priming the gate 44 and allowing a series of timing pulses generated by the timing pulse generator 6 to be passed via the gate 44, amplified by the amplifier 46 and recorded by the magnetic head 13. The flip flop 42 is initially in a reset condition because of the presence of a negative signal at its reset terminal 74. The negative signal is fed from the terminate record control 36 via the terminate pulse line 70. When the terminate record control 36 is initially set for operation a positive signal is present on the terminate pulse line 70 to allow the flip flop 42 to be set.

The marker pulse reader-recorder 34 comprises the write amplifier 50, the read amplifier 52 and the relay 54. The relay 54 has the upper contacts WB and RA, the lower contacts WA and RB, and the switch members 56A and 56B. The relay 54 is controlled by the channel switch 35 which may be a simple binary counter which is switched between two positions when a marker pulse is received via the marker pulse line 28. When the relay 54 is actuated, the switch members 56A and 56B are at the lower contacts WA and RB, respectively. In this position a marker pulse is recorded in marker channel A by means of the magnetic head 12A and a recorded marker pulse is read from the marker channel B by means of the magnetic head 12B. With the switch members 56A and 56B in the upper position a marker pulse is recorded in the marker channel B and read from the marker channel A.

The read marker pulses are coupled via the contacts RA and RB to the read amplifier 52 which in turn is connected to the gate 24 by means of the read marker pulse line 26. The contacts WA and WB are connected to the output of the write amplifier 50 which amplifies marker pulses which appear on the marker pulse line 28.

The terminate record control 36 comprises the delay line 60, the gate 62 and the flip flop 64 in series. The delay line 60 connects the output terminal of the flip flop 42 of a timing pulse recorder 10 to the gate 62 to which is coupled the record pulse line 22. The output of the gate 62 is coupled to the flip flop 64 which is normally reset so that a positive potential appears at its negative output terminal 75 and a negative potential appears at its positive output terminal 72. The negative output terminal 75 is coupled to the reset terminal 74 of the flip flop 42 so that flip flop 42 which is set by the appearance of the record pulse is thereafter reset by the appearance of a negative potential at the reset terminal 74. The delay line 60 (one-half pulse delay) prevents the flip flop 64 from being set prematurely when a record pulse sets flip flop 42. Initially, in order to clear the apparatus, the reset terminal 73 of the flip flop 64 is momentarily switched from a positive potential to a negative potential to make sure that flip flop 64 is initially in a reset condition. Thus, when switch 71 reconnects the positive potential to the reset terminal 73, flip flops 42 and 64 are in condition to be set.

Figure 3:
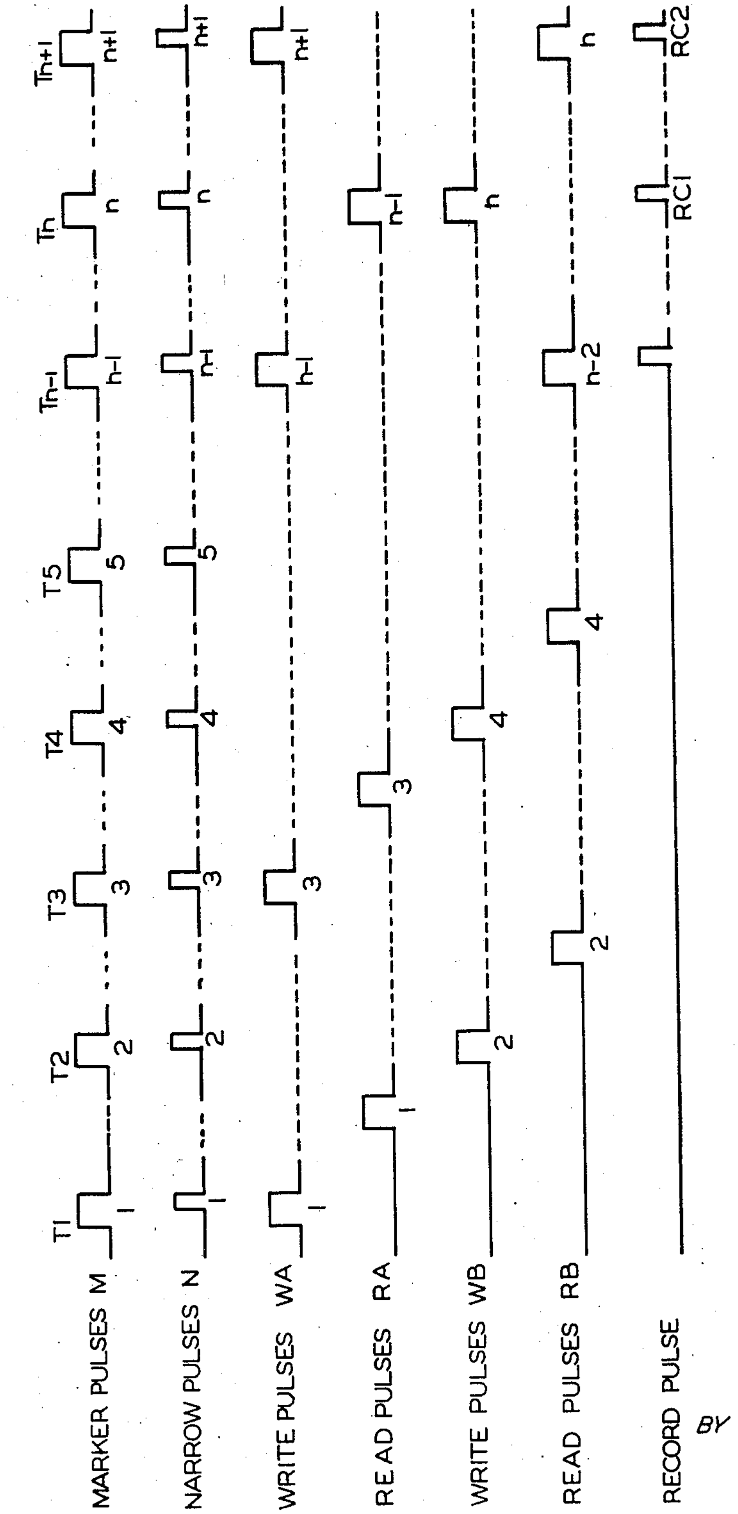
Fig. 3 is a table diagrammatically illustrating the timing of the signals produced in the timing pulse recording apparatus shown in Fig. 2.

The method of the invention will be described in detail in connection with the timing table illustrated in Fig. 3 which shows pulse signals which appear at various points in the apparatus of Fig. 2.

The marker pulses M hereinafter termed M1, M2, etc., appear periodically on the marker pulse line 28 (in the illustrated example every eighteen hundredth pulse). The narrow pulses N which will be called N1, N2, etc., are periodically present on the narrow pulse line 30 in synchronism with the marker pulses M having a duration of about two-fifths of the pulse duration of the marker pulses M and positioned so that the trailing edges of the marker pulses M and narrow pulses N correspond. The write pulses WA correspond to the pulses recorded in channel A and the read pulses RA correspond to the pulses read from channel A. Similarly the write pulses WB are recorded in channel B and the read pulses RB are read from channel B. The individual write and read pulses WA and RB are designated in a manner similar to the designation of the marker and narrow pulses.

In accordance with this application of the method of the invention the voltage on the motor 14 is reduced from about one hundred and ten volts to about forty volts by the variable transformer 18. In one working application of the method the drum 4 slows down from about 3600 revolutions per minute at the rate of two hundred revolutions per minute every minute when the motor voltage is thus reduced. In terms of the time duration of the pulse period of the pulses generated by the timing pulse generator 6, this amounts to a deceleration of .0324 of a pulse period per revolution when the drum is rotating at about the exact velocity (3333 R. P. M.) to record 1800 ten microsecond pulses. With the drum 4 slowing down the timing pulse generator 6 is turned on and marked pulses are periodically generated by the marker pulse generator 41. As shown in Fig. 3, at time T1 the marker pulse M1 is generated and the corresponding write pulse WA1 is recorded in the marker channel A by the marker pulse reader-recorder 34 since the switch members 56A and 56B of the relay 54 are initially in the lower position. At the same time, however, the channel switch 35 is operated by the same marker pulse M1. However, due to the mechanical inertia of the relay 54 the write pulse WA1 is recorded before the switch member 56A moves from the contact WA. Also at time T1 the marker channel B is sensed. However, since no marker pulse was previously recorded in channel B, no signal is coupled to the read amplifier 52 via the contact RB.

In order to prevent improper operation of the apparatus, marker pulses are recorded and read from the marker channels A and B alternately to make sure that each preceding recorded marker pulse is completely erased before the next marker pulse is recorded. It should be noted that when the write amplifier 50 is connected to one of the heads, the associated channel is being erased except when a marker pulse is present at the write amplifier 50.

At time T2 when the marker pulse M2 is generated it is recorded as the write pulse WB2. At the same time the marker channel A is examined via the marker pulse reader-recorder 34 by the examining gate 24. As explained above, since the drum is initially rotating faster than the proper speed required for the timing channel recording the read pulse RA1 occurs before time T2 so that there is no coincidence of the marker pulse M2 and the read pulse RA1 at the examining gate 24.

Similarly at time T3 the write pulse WA3 is recorded in channel A and the contents of channel B is sensed. Since the drum 4 is still rotating too fast the read pulse RB2 occurs before time T3 so that a record pulse is not generated by the examining gate 24.

At time T4 the write pulse WB4 is recorded in channel B and the contents of marker channel A is examined simultaneously. However, the read pulse RA3 occurs before the marker pulse M4 at the examining gate 24.

It should be noted that as the drum slows down the read pulses will start to approach synchronism with subsequent marker pulses so that at time T*n* it will be assumed that coincidence between a marker pulse and a read pulse occurs indicating that the drum will make the next revolution in eighteen milliseconds so that eighteen hundred pulses when recorded will completely occupy the timing channel 2 without a closure error.

Thus at time T*n*–1 the marker pulse M*n*–1 is recorded in channel A while being compared with the read pulse RB*n*–2. As illustrated in Fig. 3, exact coincidence has not yet occurred so that the overlapping portion of the marker, narrow and read pulses is not of sufficient duration to generate a record pulse on the pulse line 22 which is sufficient to actuate the flip flop 42.

In the illustrated embodiment of the invention the flip flop 42 required an input pulse of about two microseconds to be actuated. However, other flip flops could be used which would be actuated with a signal of much smaller duration; for example, one-half microsecond. In that case the narrow pulses N would be chosen in terms of pulse length and pulse position to permit a pulse of about one-half microsecond to be passed by the examining gate 24 when a read pulse occurs in exact synchronism with the marker pulse.

At time T*n* the read pulse RA*n*—1 occurs exactly in synchronism with the marker pulse M*n* so that a record pulse RC1 is produced on the record pulse line 22 which actuates the flip flop 42 of the timing pulse recorder 10 permitting the gate 44 to pass timing pulses from the generator 6 which are recorded in the timing channel 2. At time T*n*+1, although the read pulse RB*n* occurs slightly after the marker pulse M*n*+1, a second record pulse is produced due to the continued overlapping of the narrow pulse N$n$+1 and the read pulse RB$n$. Since the flip flop 42 is already set, the gate 62 of the terminate record control 36 is primed due to the positive potential appearing at the output of the flip flop 42 so that the gate 62 passes the record pulse RC2 to the flip flop 64 which sets the flip flop 64 which in turn resets the flip flop 42 blocking gate 44, and actuates the indicator 38.

Thus the eighteen hundredth pulse results in blocking the gate 44 to prevent further recording of timing pulses in the timing channel 2. However, it should be noted that the drum 4 does not slow down that fast per revolution to produce closure error so that even if additional pulses were recorded in channel 2, during the last revolution they would overlap the positions occupied by the earlier recorded timing pulses.

In accordance with another application of the method of the invention a counter may be interposed between the record pulse line 22 and the gate 62 to allow the timing signal to be recorded for a number of revolutions depending on the size of the counter thus preventing the actuation of the terminate record control 36 for the same number of revolutions. In this application it is preferable to begin the recording at a time preceding actual synchronism between the recorded pulses and the marker pulses. This may be accomplished by properly positioning the narrow pulses N with respect to the marker pulses M. The timing signal recording produced will be the result of an averaging effect.

Thus, in accordance with the invention a method of and apparatus for quickly and accurately recording a timing channel on a rotating magnetic drum have been provided. Further, in accordance with the method of the invention the occurrence of a closure error may readily be avoided.

There will now be obvious to those skilled in the art many modifications and variations utilizing the principle of the method of the invention (which is to employ a signal generated by the moving magnetic drum to indicate when the drum velocity corresponds to the speed which will allow the exact number of timing signals to be recorded completely around the periphery of the drum) which will realize many or all of the objects and advantages but which do not depart essentially from the invention.

What is claimed is:

1. Apparatus for recording a timing signal on a rotating drum comprising a signal source, means for recording a signal on the rotating drum and for reading the recorded signal, means for varying the time relationship between the recorded signal and selected signals from said signal source, means for sensing a predetermined time relationship between said recorded signal and said selected signals, and means responsive to said signal source for recording a timing signal on said rotating drum when said predetermined time relationship occurs.

2. Apparatus for recording a timing signal on a rotating drum comprising a signal source, means for recording a signal on the rotating drum and for reading the recorded signal, means for varying the time relationship between the recorded signal and selected signals from said signal source, means for sensing synchronism between said recorded signal and said selected signals, and means responsive to said signal source for recording a timing signal on said rotating drum when synchronism occurs.

3. Apparatus for recording a timing signal on a rotating drum comprising a signal source, means for recording a signal on the rotating drum and for reading the recorded signal, means for varying the frequency of the recorded signal, means for sensing a predetermined time relationship between said recorded signal and said selected signals, and means for recording a timing signal on said rotating drum when said predetermined time relationship occurs.

4. Apparatus for recording a timing signal on a rotating drum comprising a signal source, means for recording a signal on the rotating drum and for reading the recorded signal, means for varying the velocity of said rotating drum, means for sensing a predetermined time relationship between said recorded signal and the velocity of said rotating drum, and means responsive to said signal source for recording a timing signal on said rotating drum when said predetermined time relationship occurs.

5. Apparatus for recording timing signals on a rotating drum comprising a signal source, means for recording a signal on the rotating drum and for reading the recorded signal, means for varying the time relationship between the recorded signal and selected signals from said signal source, means for sensing a predetermined time relationship between said recorded signal and said selected signals, and means responsive to said signal source for recording a timing signal on said rotating drum during a plurality of drum revolutions after said predetermined time relationship occurs.

6. Apparatus for recording timing signals on a rotating drum comprising a signal source, means for recording signals in a plurality of channels on the rotating drum and for reading the recorded signals, means for varying the time relationship between the recorded signals and selected signals from said signal source, means for sensing a predetermined time relationship between said recorded signals and said selected signals, and means responsive to said signal source for recording a timing signal on said rotating drum when said predetermined time relationship occurs.

References Cited in the file of this patent

UNITED STATES PATENTS

| | | |
|---|---|---|
| 2,411,648 | Brauer | Nov. 26, 1946 |
| 2,680,241 | Gudley | June 1, 1954 |